United States Patent
Peck, Jr. et al.

(10) Patent No.: US 9,857,248 B2
(45) Date of Patent: Jan. 2, 2018

(54) SENSOR SYSTEM FOR LAMINATED STRUCTURES

(71) Applicant: The Boeing Company, Chicago, IL (US)

(72) Inventors: James L. Peck, Jr., Huntington Beach, CA (US); Arun Muley, San Pedro, CA (US)

(73) Assignee: The Boeing Company, Chicago, IL (US)

( * ) Notice: Subject to any disclaimer, the term of this patent is extended or adjusted under 35 U.S.C. 154(b) by 237 days.

(21) Appl. No.: 14/740,984

(22) Filed: Jun. 16, 2015

(65) Prior Publication Data

US 2016/0370238 A1    Dec. 22, 2016

(51) Int. Cl.
*G01L 1/24* (2006.01)
*G01K 7/00* (2006.01)
(Continued)

(52) U.S. Cl.
CPC .............. *G01L 1/241* (2013.01); *G01D 5/353* (2013.01); *G01K 7/00* (2013.01); *G01K 11/32* (2013.01);
(Continued)

(58) Field of Classification Search
CPC ....... G01B 11/002; G01B 11/16; G01B 11/24; G01D 5/268; G01D 5/30; G01D 5/353;
(Continued)

(56) References Cited

U.S. PATENT DOCUMENTS 4,761,073 A * 8/1988 Meltz ............... G01B 11/16
250/227.18
4,806,012 A * 2/1989 Meltz ............... G01B 11/16
356/32

(Continued)

FOREIGN PATENT DOCUMENTS

WO    2006094351 A1    9/2006
WO    2008011663 A1    1/2008

OTHER PUBLICATIONS

European Patent Office; Extended European Search Report for European Patent Application No. 16173039.5 dated Oct. 24, 2016, 8 Pages.

(Continued)

*Primary Examiner* — Jonathan Dunlap
(74) *Attorney, Agent, or Firm* — Charles L. Moore; Moore & Van Allen PLLC

(57) ABSTRACT

A sensor system for a laminated structure may include a sensor assembly disposed between a first layer and a second layer of the laminated structure. The sensor assembly may include a first anchor member and a second anchor member spaced at a predetermined distance from one another. A sensor chamber is formed between the first and second anchor members. The sensor assembly may also include a sensing line extending through the anchor members and the sensor chamber. The sensing line may include a configuration within the sensor chamber for sensing one of stress forces within the laminated structure, temperature or temperature changes within the laminated structure. A first transport tube may extend from the first anchor member opposite the sensor chamber and a second transport tube may extend from the second anchor member opposite the sensor chamber. The sensing line extends through the first and second transport tubes.

20 Claims, 5 Drawing Sheets

(51) Int. Cl.
*G01L 1/18* (2006.01)
*G02B 6/36* (2006.01)
*G01B 11/00* (2006.01)
*G01B 11/16* (2006.01)
*G01K 1/08* (2006.01)
*G01D 5/30* (2006.01)
*G01D 5/26* (2006.01)
*G01K 11/32* (2006.01)
*G01D 5/353* (2006.01)

(52) U.S. Cl.
CPC ............... G01L 1/18 (2013.01); G01L 1/242 (2013.01); G01L 1/246 (2013.01); *G01B 11/002* (2013.01); *G01B 11/16* (2013.01); *G01D 5/268* (2013.01); *G01D 5/30* (2013.01); *G01D 5/3537* (2013.01); *G01D 5/35316* (2013.01); *G01K 1/08* (2013.01); *G01K 11/3206* (2013.01); *G01L 1/247* (2013.01); *G02B 6/3608* (2013.01)

(58) Field of Classification Search
CPC .... G01D 5/35316; G01D 5/3537; G01K 1/08; G01K 1/32; G01K 1/3206; G01K 7/00; G01L 1/18; G01L 1/24; G01L 1/241; G01L 1/242; G01L 1/246; G01L 1/247; G02B 6/3608
USPC .......... 374/137, 141, 142, 161; 385/12, 123, 385/126, 13; 73/760, 768, 800, 73/862.041–862.046, 862.624, 862.632
See application file for complete search history.

(56) References Cited

U.S. PATENT DOCUMENTS

| | | | | |
|---|---|---|---|---|
| 5,399,854 A * | 3/1995 | Dunphy | ............... | G01K 5/72 250/227.14 |
| 6,269,207 B1 * | 7/2001 | Carberry | ............ | G02B 6/02095 385/123 |
| 6,955,085 B2 * | 10/2005 | Jones | ............... | G01H 9/004 250/227.14 |
| 7,018,217 B2 * | 3/2006 | Marshall | ............... | B32B 3/08 174/117 FF |
| 7,295,724 B2 * | 11/2007 | Wang | ............... | A61B 5/6892 385/13 |
| 7,512,294 B2 * | 3/2009 | Wang | ............... | A61B 5/6892 385/13 |
| 7,680,363 B2 * | 3/2010 | Wakahara | ............... | G01L 1/246 385/12 |
| 7,840,102 B2 * | 11/2010 | Boyd | ............... | E21B 47/065 385/12 |
| 7,855,632 B1 | 12/2010 | Schuh et al. | | |
| 7,924,031 B2 * | 4/2011 | Watkins, Jr. | ............ | G01N 27/041 324/541 |
| 8,031,988 B2 * | 10/2011 | Arkwright | ............ | A61B 5/037 250/227.14 |
| 8,290,315 B2 * | 10/2012 | Saunders | ............ | G01D 5/35383 29/709 |
| 8,503,834 B2 * | 8/2013 | Arkwright | ............ | G01L 1/246 385/13 |
| 8,701,500 B2 * | 4/2014 | Swinehart | ............ | G02B 6/02209 73/800 |
| 9,074,946 B2 * | 7/2015 | Schmidt | ............ | G01K 1/08 |
| 2001/0028764 A1 * | 10/2001 | Carberry | ............ | G02B 6/02095 385/37 |
| 2004/0237648 A1 * | 12/2004 | Jones | ............... | G01H 9/004 73/514.26 |
| 2005/0232532 A1 * | 10/2005 | Wang | ............ | A61B 5/6892 385/13 |
| 2006/0285813 A1 * | 12/2006 | Ferguson | ............ | G01B 11/16 385/138 |
| 2007/0096751 A1 * | 5/2007 | Georgeson | ............ | G01R 27/2623 324/691 |
| 2007/0258674 A1 * | 11/2007 | Wang | ............ | A61B 5/6892 385/13 |
| 2008/0026187 A1 * | 1/2008 | Hauer | ............ | H05K 3/0052 428/188 |
| 2008/0085074 A1 | 4/2008 | Wakahara et al. | | |
| 2008/0188776 A1 * | 8/2008 | Arkwright | ............ | G01L 1/246 600/593 |
| 2008/0192230 A1 * | 8/2008 | Arkwright | ............ | A61B 5/037 356/35.5 |
| 2009/0003759 A1 * | 1/2009 | Boyd | ............ | E21B 47/065 385/13 |
| 2009/0121121 A1 * | 5/2009 | Dunleavy | ............ | G01M 5/0033 250/227.14 |
| 2010/0080501 A1 * | 4/2010 | Saunders | ............ | G01D 5/35383 385/12 |
| 2010/0140462 A1 * | 6/2010 | Farrell | ............ | B63H 9/04 250/227.14 |
| 2011/0017867 A1 * | 1/2011 | Simmons | ............ | C08J 5/24 244/1 A |
| 2011/0107843 A1 * | 5/2011 | Hucker | ............ | B29C 70/10 73/802 |
| 2014/0321799 A1 | 10/2014 | Udd | | |

OTHER PUBLICATIONS

Wilson, Earl J.; "Strain-Gage Instrumentation," Harris' Shock and Vibration Handbook, 2002, pp. 17.1-17.15, Chapter 17, 5th Edition.
Chee, Clinton Y.K., et al.; "A Review on the Modelling of Piezoelectric Sensors and Actuators Incorporated in Intelligent Structures," Journal of Intelligent Material Systems and Structures, 1998, pp. 3-19, vol. 9.
Simoes Moita, Jose M., et al.; "Active control of adaptive laminated structures with bonded piezoelectric sensors and actuators," Computers and Structures, 2004, pp. 1349-1358, vol. 82.
Fedder, Gary K., et al.; "Laminated High-Aspect-Ratio Microstructures in a Conventional CMOS Process," Proceedings of the IEEE Micro Electro Mechanical Systems Workshop, 1996, pp. 13-18.

* cited by examiner

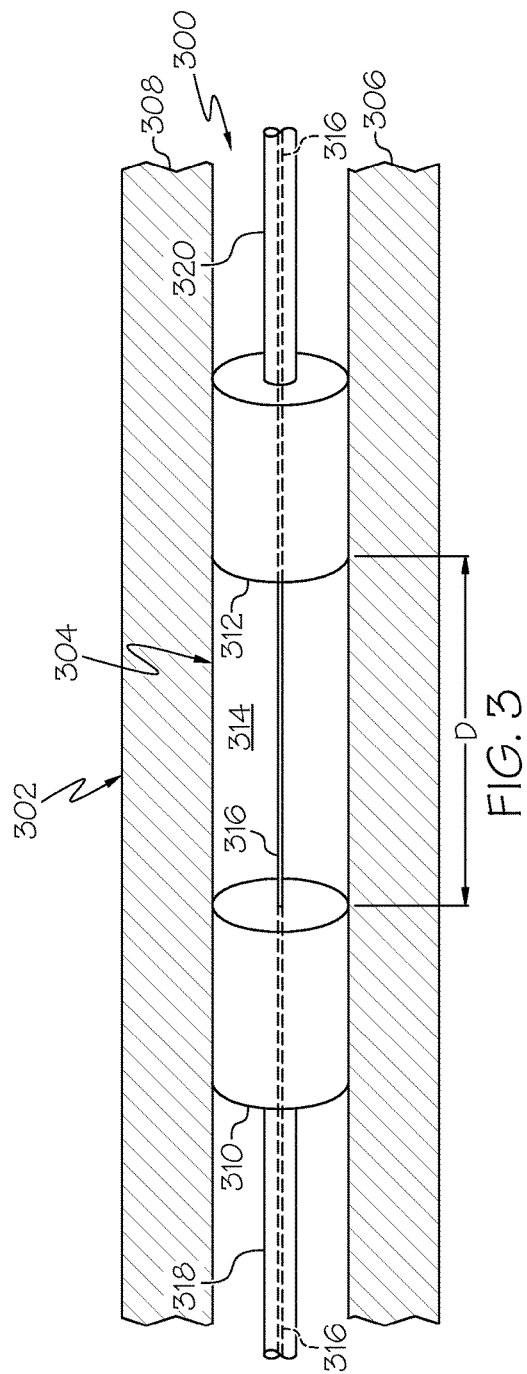
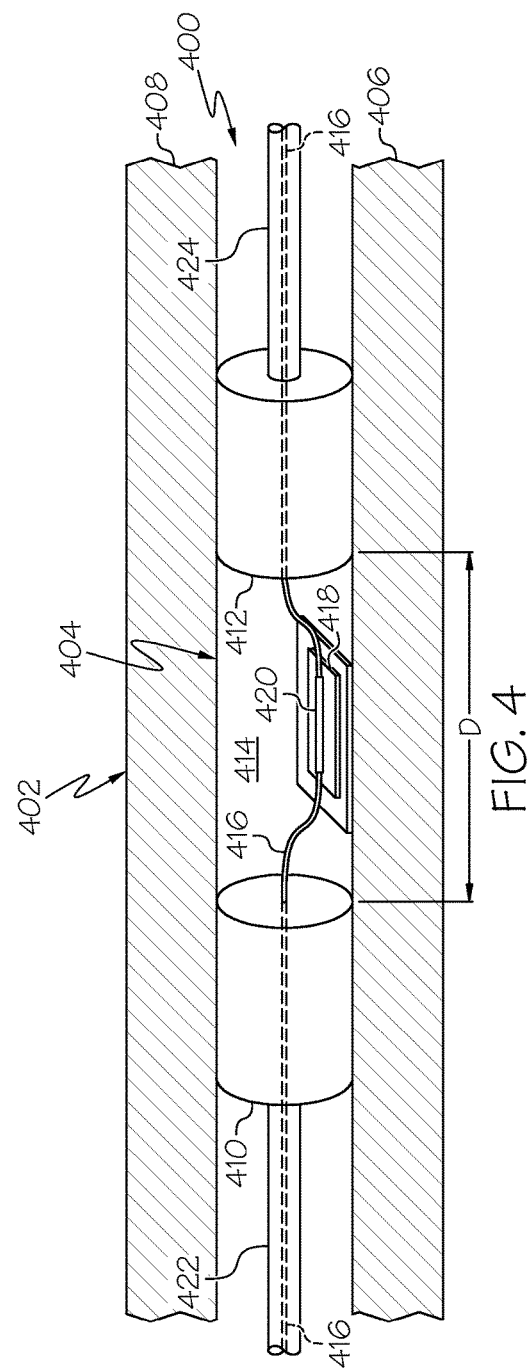

SENSOR SYSTEM FOR LAMINATED STRUCTURES

FIELD

The present disclosure relates to laminated structures and systems for determining environmental effects on laminated structures, such as forces and temperatures, and more particularly to a sensor system for laminated structures.

BACKGROUND

Laminated structures are becoming more widely used in making articles, such as aircraft and other vehicles or equipment where light weight but strong material are beneficial. Laminated structures in such applications may be subjected to various environmental conditions, such as extreme forces and loading that may be applied in various ways and temperature changes that may vary over a wide range. Sensors for determining or measuring such environmental conditions are mounted on an exterior surface of laminated structures. Data from these external sensors may be analyzed to project or estimate the effects of the environmental conditions within the laminated structure but external sensors cannot provide direct monitoring of conditions within the interior of the laminated structure.

SUMMARY

In accordance with an embodiment, a sensor system for a laminated structure may include a sensor assembly disposed between a first layer of the laminated structure and a second layer of the laminated structure. The second layer of the laminated structure is disposed on the first layer and the sensor assembly. The sensor assembly may include a first anchor member and a second anchor member spaced at a predetermined distance from the first anchor member. A sensor chamber is formed between the first anchor member and the second anchor member. The sensor assembly may also include a sensing line extending between the first anchor member and the second anchor member through the sensor chamber and through the first anchor member and the second anchor member. The sensing line may include a configuration within the sensor chamber for sensing one of stress forces within the laminated structure, temperature or temperature changes within the laminated structure. The sensor system may also include a first transport tube extending from the first anchor member opposite the sensor chamber and between the first layer of the laminated structure and the second layer of the laminated structure. The sensor system may additionally include a second transport tube extending from the second anchor member opposite the sensor chamber and between the first layer of the laminated structure and the second layer of the laminated structure. The sensing line also extends through the first transport tube and the second transport tube.

In accordance with another embodiment, a sensor for a laminated structure may include a first anchor member and a second anchor member spaced at a predetermined distance from the first anchor member. The sensor may also include a sensor chamber formed between the first anchor member and the second anchor member and a sensing line extending between the first anchor member and the second anchor member through the sensor chamber and through the anchor members. The sensing line may include a configuration within the sensor chamber for sensing one of stress forces within the laminated structure, temperature or temperature changes within the laminated structure. The sensor may also include a first transport tube extending from the first anchor member opposite the sensor chamber and between the first layer of the laminated structure and the second layer of the laminated structure. The sensor may also include a second transport tube extending from the second anchor member opposite the sensor chamber and between the first layer of the laminated structure and the second layer of the laminated structure. The sensing line also extends through the first transport tube and the second transport tube. The sensing line extends through the first transport tube and the second transport tube without any tension on the sensing line to prevent any stress on the sensing line within the first transport tube and the second transport in response to forces being applied to the laminated structure.

In accordance with a further embodiment, a method of sensing at least one of stress and temperature within a laminated structure may include providing one or more pairs of sensor anchor members on a first layer of the laminated structure. Each pair of sensor anchor members may be spaced a predetermined distance apart to provide a sensor chamber between each pair of sensor anchor members. The method may also include providing a transport tube between each pair of sensor anchor members on the first layer of the laminated structure. The method may additionally include extending a sensing line through each transport tube and through each sensor chamber. The sensing line is extended through each transport tube without any tension on the sensing line within each transport tube to prevent any stress on the sensing line in the transport tubes in response to forces being applied to the laminated structure. The method may further include configuring each sensing line within each sensor chamber for sensing one of stress forces within the laminated structure, temperature or temperature changes within the laminated structure. The method may additionally include depositing a second layer of the laminated structure on the first layer.

In accordance with another embodiment or any of the previous embodiments, the sensor or sensor assembly may include a stress sensor. The sensing line may be held within the sensor chamber by a first anchor member and a second anchor member at a preset tension to form the stress sensor, wherein a physical stress applied to the laminated structure causes a corresponding change to the preset tension of the sensing line within the sensor chamber.

In accordance with another embodiment or any of the previous embodiments, the sensor or sensor assembly may include a thermal sensor. The thermal sensor may include a thermally sensitive plate disposed within the sensor chamber and a selected portion of the sensing line is attached to the thermally sensitive plate to form the thermal sensor. The sensing line extends from the thermally sensitive plate respectively to a first anchor member and a second anchor member without any tension or a predetermined amount of slack. Changes in temperature in the sensor chamber cause the thermally sensitive plate to distort which causes stress in the sensing line corresponding to the temperature or changes in temperature.

In accordance with another embodiment or any of the previous embodiments, the sensing line may include one of an optical fiber and an electrically conductive wire. Either an optical signal or a radio frequency (RF) signal may be transmitted through the sensing line to measure or detect stress in the laminated structure, or temperature or temperature changes in the laminated structure.

BRIEF DESCRIPTION OF THE DRAWINGS

The following detailed description of embodiments refers to the accompanying drawings, which illustrate specific embodiments of the disclosure. Other embodiments having different structures and operations do not depart from the scope of the present disclosure.

FIG. 3 is a cross-sectional view of a laminated structure including an example of a sensor assembly configured to provide a stress sensor of a sensor system in accordance with an embodiment.

FIG. 4 is a cross-sectional view of a laminated structure including an example of a sensor assembly configured to provide a thermal sensor of a sensor system in accordance with an embodiment.

DETAILED DESCRIPTION

Figure 1:
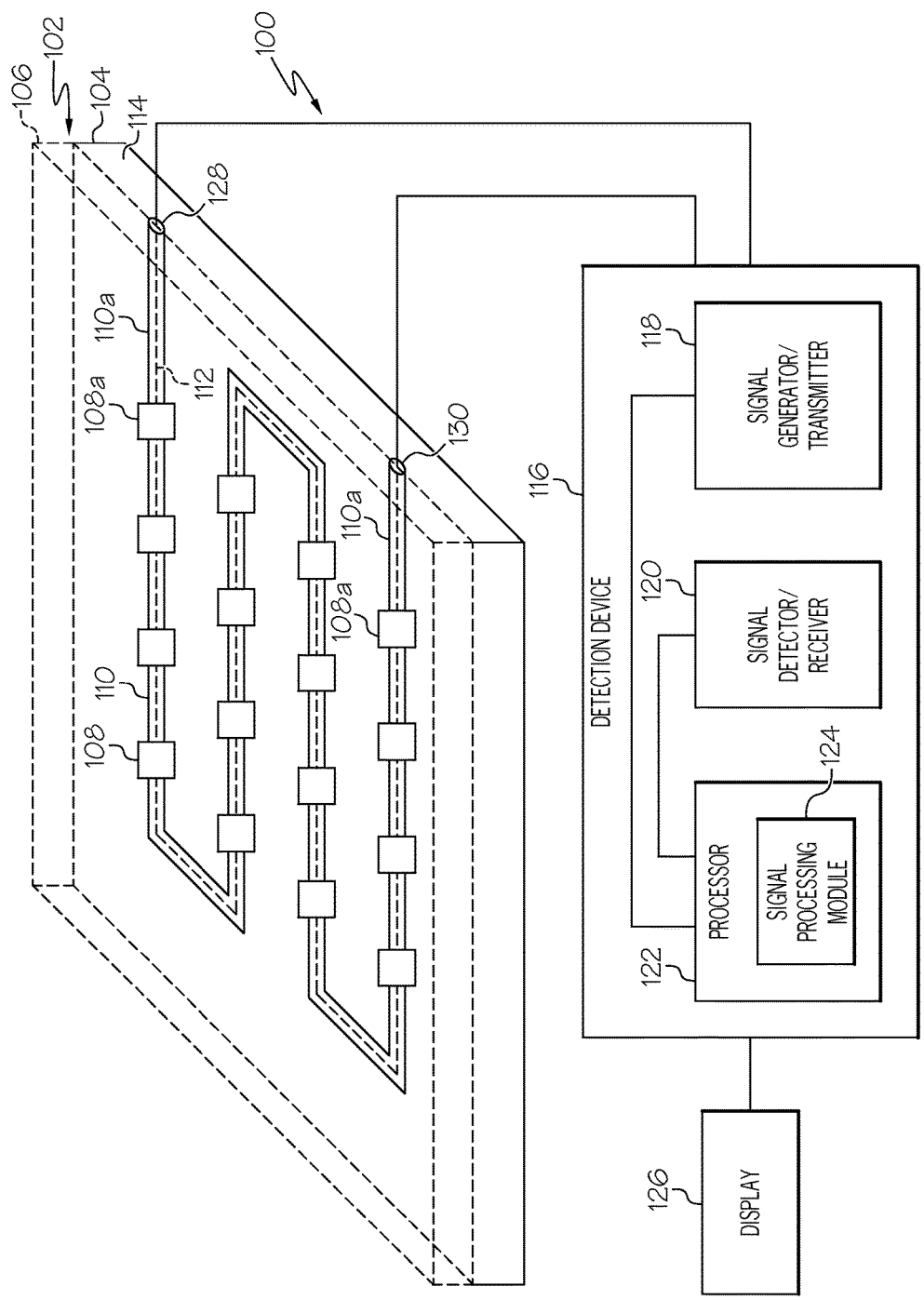
FIG. 1 is a schematic diagram of an example of a sensor system for monitoring internal conditions of a laminated structure in accordance with an embodiment.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

Certain terminology is used herein for convenience only and is not to be taken as a limitation on the embodiments described. For example, words such as "proximal", "distal", "top", "bottom", "upper," "lower," "left," "right," "horizontal," "vertical," "upward," and "downward", etc., merely describe the configuration shown in the figures or relative positions used with reference to the orientation of the figures being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

FIG. 1 is a schematic diagram of an example of a sensor system 100 for monitoring internal conditions of a laminated structure 102 in accordance with an embodiment. The laminated structure 102 may be part of a component of an aircraft, such as for example a portion of a wing, fuselage, bulkhead or other component of an aircraft or other vehicle. The laminated structure 102 may also be part of or a component of another structure including but not necessarily limited to a civil structure, such as a building or bridge, an electrical transformer, a motor, a composite structure, a storage tank, hull or other component of a ship or other structures. Laminated structures may include a plurality of layers of material that may be bonded together to form a structure that is typically stronger and lighter in weight than a single layer of material that would have to be thicker to provide the same strength or durability. In the example illustrated in FIG. 1, the laminated structure 102 includes a first layer 104 and a second layer 106. In other embodiments, the laminated structure 102 may include more than two layers. The second layer 106 is shown by broken or dashed lines to permit the sensor components or sensor assemblies 108 and transport tubes 110 for the sensing line 112 of the sensor system 100 to be shown. The transport tubes 110 extend between each of the sensor assemblies 108, and between each terminal sensor assembly 108a and an edge 114 of the laminated structure 102. Each of the sensor assemblies 108 may be configured to provide a stress sensor for sensing stress or strain forces, or a thermal sensor for sensing temperature or temperature changes. An example of a sensor assembly 108 configured to provide a stress sensor will be described with reference to FIG. 3 below. An example of a sensor assembly 108 configured to provide a thermal sensor will be described with reference to FIG. 4.

The sensor system 100 may include a plurality of sensor assemblies 108 distributed at predetermined locations in the laminated structure 102 between the first layer 104 of the laminated structure 102 and the second layer 106 of the laminated structure 102. As previously discussed, each sensor assembly 108 or the sensing line 112 within each sensor assembly 108 may be configured to provide one of a stress sensor that senses stress forces within the laminated structure 102 or a thermal sensor that senses temperature or temperature changes within the laminated structure 102.

The sensor system 100 may include a plurality of transport tubes 110. A transport tube 110 may extend between adjacent sensor assemblies 108. In the exemplary sensor system 100 shown in FIG. 1, the plurality of sensor assemblies 108 are connected in series by the transport tubes 110. Another one of the transport tubes or an end transport tube 110a may extend from each end or terminal sensor assembly 108a of the series connected sensor assemblies 108 to an edge 114 of the laminated structure 102. The sensing line 112 extends loosely through the plurality of transport tubes 110 without any tension on the sensing line 112 within the transport tubes 110 so that any forces applied to the laminated structure 102 will not cause any stress (compression or tension) or strain on the sensing line 112 within the transport tubes 110.

The sensing line 112 may be any conductive medium in which the conductivity of the sensing line 112 or medium may be modified based on a physical stress being applied to the sensing line 112 or conductive medium. As described herein the physical stress may be applied by external forces being applied to the laminated structure 102 or the result of temperature or temperature changes within the laminated structure 102 that cause modification of the conductivity of the sensing line 112 or conductive medium. The changes or modification of the conductivity may be determined or sensed by transmitting a signal or signals through the sensing line 112 or conductive medium. The stress, temperature, or temperature changes may be determined or calculated by detecting changes in one or more properties or parameters of the transmitted signal or signals, such as time, frequency and amplitude changes caused by the changes or modification of the conductivity of the sensing line 112.

In accordance with an embodiment, the sensing line 112 may be an optical fiber for transmitting optical signals. In another embodiment, the sensing line 112 may be an electrically conductive wire for carrying electrical signals or radio frequency (RF) signals. In yet another embodiment, sensing line 112 may be a resistive wire where a relevant portion of the resistive wire may have a characteristic resistivity based on the tension per unit length. Various materials and methods of measurement are known to those of skill in the art. The actual stress (or temperature) measurement values are possible to determine quite accurately based on the selection of materials and the length of the sensing line portion under tension, but often it is the relative measurement values over time that may be more useful since these can indicate the presence of an emergent, degenerate condition that could damage or reduce the useful life of the instrumented structure 102.

A detection device 116 may be operatively connected to the sensing line 112. The detection device 116 may be configured to detect or determine one or more of physical stress, temperature or temperature changes in each of the sensor assemblies 108 based on a signal or signals received from each of the plurality of sensor assemblies 108. The detection device 116 may include a signal generator or transmitter 118 operatively connected to one end or an input end 128 of the sensing line 112 to transmit a signal or signals through the sensing line 112. The detection device 116 may also include a signal detector or receiver 120 that may be operatively connected to another end or output end 130 of the sensing line 112 and configured to receive the signal or signals from the plurality of sensor assemblies 108. The detector device 116 may additionally include a processor 122 programmed with a location of each of the plurality of sensor assemblies 108 within the laminated structure 102. The processor 122 may include a signal processing module 124 that may be configured to determine one or more of a physical stress, a temperature or temperature changes at each of the sensor assemblies 108. The physical stress, temperature or temperature changes at each of the sensor assemblies 108 are based on changes to one or more properties or parameters of the transmitted signal or signals detected by each the plurality of sensor assemblies 108 caused by modification or changes to the conductivity of the sensing line 116 in the respective sensor assemblies 108. The one or more properties or parameters of the transmitted signal or signals that may be changed by modifications in the conductivity of the sensing line 112 may include the timing, frequency and amplitude of the signal or signals. By synchronizing a timing of transmission of the signal or signals with a known location of each of the sensor assemblies 108 along the sensing line 116 within the laminated structure 102, any changes in conductivity within each of the sensor assemblies 108 may be detected from the signal or signals received by the signal detector or receiver 120. The corresponding physical stress, temperature or temperature changes may be determined or calculated by the signal processing module 124 from changes in the one or more properties or parameters of the transmitted signal or signals.

A display 126 may be associated with the detection device 116, as shown in the exemplary embodiment in FIG. 1, or the display 126 may be incorporated as part of the detection device 116. In one embodiment, where the sensor assemblies 108 are configured to provide stress sensors, stress measurements within the laminated structure 102 from analysis of the signals from the sensor assemblies 108 may be presented on the display 126. In another embodiment, where the sensor assemblies 108 are configured to provide thermal sensors, temperature measurements or temperature change measurements within the laminated structure 102 from analysis of the signals from the sensor assemblies 108 may be presented on the display 126. In a further embodiment, some sensor assemblies 108 may be configured to provide stress sensors and other sensor assemblies 108 may be configured to provide thermal sensors. In this embodiment, either stress measurements or temperature measurements within the laminated structure 102 may be presented on the display 126. Stress and temperature measurements or calculations may be presented over time to analyze different conditions within the laminated structure 102. For example, the temperature and stress measurements across an interior of the laminated structure may be plotted to determine hot or cold spots, weak stress points or other properties or characteristics of the laminated structure 102.

In accordance with an embodiment, the sensing line 112 may be an optical fiber. In this embodiment, the signal generator or transmitter 118 may be an optical signal generator that transmits an optical signal through the sensing line 112 or optical fiber. The signal detector or receiver 120 may be an optical signal detector that measures one or more properties or parameters of the transmitted optical signal at the output 130 of the sensing line 112. The signal processing module 124 may determine a stress on the laminated structure 102 at a location of a stress sensor or temperature or temperature changes at a location of a thermal sensor based on measurement of one or more properties or parameters, such as amplitude, frequency, timing or a combination thereof, of the optical signal transmitted through the optical fiber and responsive to a change or modification of conductivity of the sensing line 112 of the sensor assembly 108.

In accordance with another embodiment, the sensing line 112 may an electrically conductive wire for transmitting electrical signals or radio frequency (RF) signals. The signals may be of any nature or characteristics that may permit monitoring and detection of any changes in time, frequency or amplitude or any combination of these properties or parameters of a transmitted signal that can correspond to a measurement of temperature or stress in the laminated structure 102. In this embodiment, the signal generator or transmitter 118 may be an RF signal generator that transmits an RF signal through the electrically conductive wire or sensing line 112. The signal detector or receiver 120 may be an RF receiver that detects and monitors changes in time, frequency, amplitude or any combination thereof of the transmitted RF signal at the output 130 of the sensing line 112 or electrically conductive wire. The signal processing module 124 may determine a stress on the laminated structure 102 at a location of the stress sensor, or temperature or temperature change at a location of a thermal sensor based on changes or modification of the conductivity of the electrically conductive wire and measurement of one or more properties or parameters of the RF signal or signals transmitted through the electrically conductive wire resulting from the conductivity changes, such as changes in amplitude, timing and frequency of the signal or signals or any combination of these properties or parameters.

Figure 2:
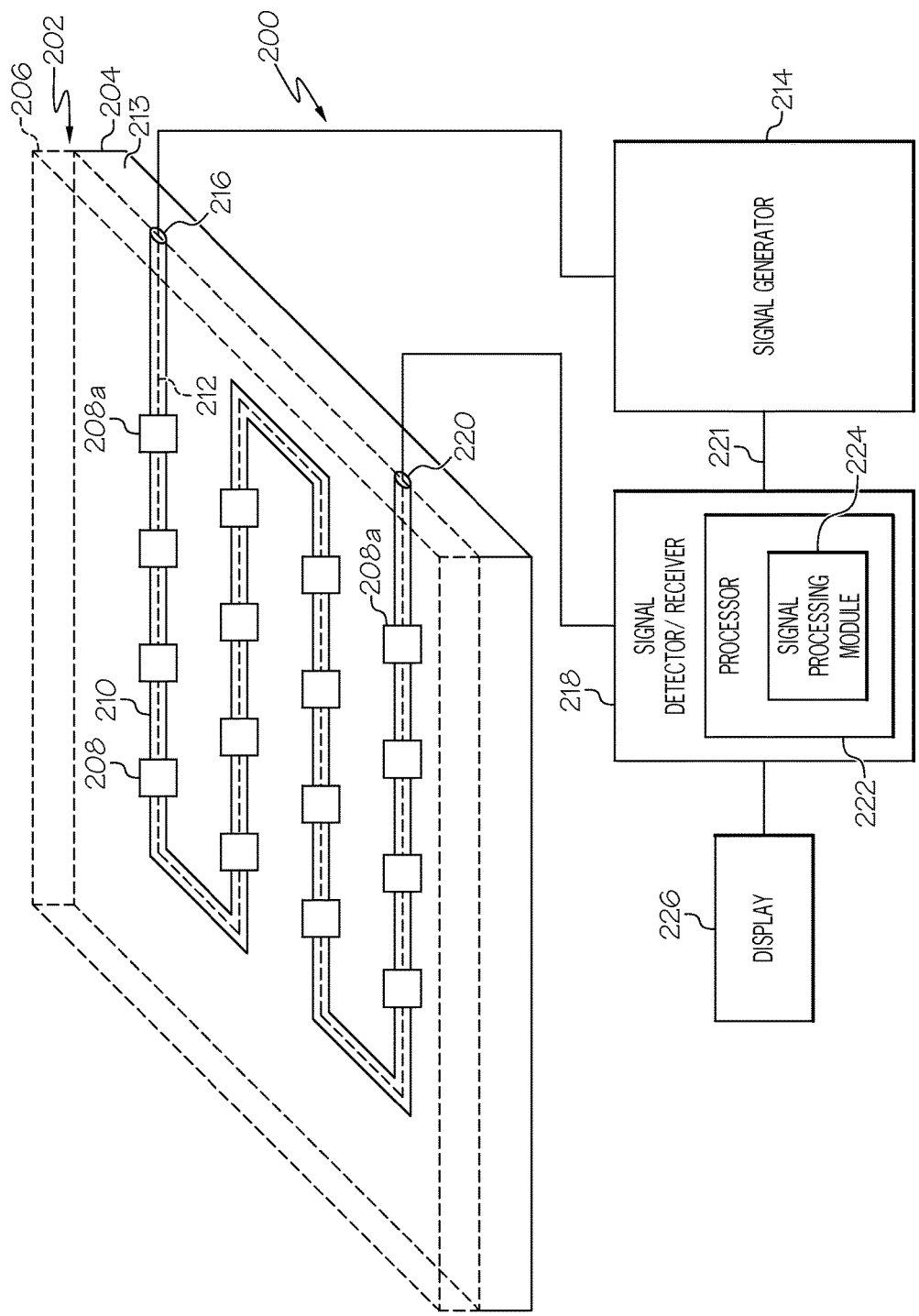
FIG. 2 is a schematic diagram of an example of a sensor system for monitoring internal conditions of a laminated structure in accordance with another embodiment.

FIG. 2 is a schematic diagram of an example of a sensor system 200 for monitoring internal conditions of a laminated structure 202 in accordance with another embodiment. The laminated structure 202 may be similar to the laminated structure 102 in FIG. 1 and may include a plurality of layers of laminated material. In the exemplary laminated structure shown FIG. 2, the laminated structure 202 may include a first layer 204 and a second layer 206 of laminated material. The second layer 206 is shown by broken or dashed lines to permit the sensor components or sensor assemblies 208 and transport tubes 210 for the sensing lines 212 of the sensor system 200 to be shown. The transport tubes 210 extend between each of the sensor assemblies 208, and between each terminal sensor assembly 208a and an edge 213 of laminated structure 202. The sensor system 200 may be similar to the sensor system 100 in FIG. 1. except that instead of having a single detection device similar to detection device 116, the sensor system 200 may include a signal generator or transmitter 214 that is operatively connected to the sensing line 212 at one end 216 of the sensing line 212 and a signal detector or receiver 218 that is operatively connected to the sensing line 212 at an opposite end 220. The exemplary sensor system 200 in FIG. 2 may be applicable in situations where the one end 216 of the sensing line 212 is at a considerable distance from the opposite end 220 of the sensing line 212 and a single detection device similar to detection device 116 in FIG. 1 would not be practical or would require a considerable length of electrical wiring or optical fiber to connect a single detection device to both ends of the sensing line 212. In another embodiment, a detection device similar to detection device 116 in FIG. 1 may be operatively connected to each end 216 and 220 of the sensing line 212. Each detection device may operate similar to detection device 116 and may detect or determine physical stress, temperature or temperature changes in each of the sensor assemblies 208 based on whether the sensor assemblies 208 are configured as stress sensors or thermal sensors and the signals received from the of the sensor assemblies 208.

The signal detector or receiver 218 may include a processor 222 or the processor may be a separate component. The processor 222 may include a signal processing module 224 that may be configured to determine one or more of a physical stress, a temperature or temperature changes for each of the sensor assemblies 208 based on whether each of the sensor assemblies 208 is configured to include a stress sensor or a thermal sensor and the signals received from each of the stress sensors or thermal sensors. A display 226 may be associated with the signal detector or receiver 218 to present analysis of the signals by the signal processing module 224 and present a representation of the stress measurements, temperature measurements or both within the laminated structure 202 based on the configuration of the sensor assemblies 208 and analysis of the signals from the sensor assemblies 208 by the signal processing module 224.

Each of the sensor assemblies 208 may be configured to provide a stress sensor or a thermal sensor. As previously discussed, an example of a sensor assembly 208 configured to provide a stress sensor will be described with reference to FIG. 3 and an example of a sensor assembly 208 configured to provide a thermal sensor will be described with reference to FIG. 4.

The sensor system 200 may include a plurality of sensor assemblies 208 distributed at predetermined locations in the laminated structure 202 between the first layer 204 of the laminated structure 202 and the second layer 206 of the laminated structure 202. As previously discussed, each sensor assembly 208 or the sensing line 212 within each sensor assembly 208 may be configured to provide one of a stress sensor that senses stress forces within the laminated structure 202 or a thermal sensor that senses temperature or temperature changes within the laminated structure 202.

In the exemplary embodiment shown in FIG. 2, the signal generator or transmitter 214 may be configured to transmit a test signal or signals through the sensing line 212 and the signal detector or receiver 218 may receive signals from the plurality of sensor assemblies 208. The signal generator 214 may be connected to the signal detector 218 by a communications link 221. A synchronization signal may be transmitted by the signal generator 214 to the signal detector 218 over the communications link to establish timing and/or a frequency lock between transmission of the test signal or signals through the sensing line 212 for detection by the signal detector 218. The communications link 221 may be a wired or wireless communications link. Similar to that previously described with respect to system 100 in FIG. 1, the synchronization signal along with a known location of each of the sensor assemblies 208 along the sensing line 212 within the laminated structure 202 allows any changes in conductivity within each of the sensor assemblies 208 to be detected from the signal or signals received by the signal detector or receiver 218 and the corresponding physical stress, temperature or temperature changes may be determined or calculated by the signal processing module 224.

In accordance with an embodiment, the sensing line 212 may be an optical fiber for transmitting optical signals. The optical signals may be of any nature or characteristics that may permit monitoring and detection of any changes in time, frequency or amplitude or any combination of these parameters or properties of a transmitted optical signal that can correspond to a measurement of temperature and/or stress in the laminated structure 202. In another embodiment, the sensing line 212 may be an electrically conductive wire for carrying electrical signals or RF signals. The electrical or RF signals may be of any nature or characteristics that may permit monitoring and detection of any changes in time, frequency or amplitude or any combination of these parameters or properties of a transmitted signal that can correspond to a measurement of temperature and/or stress in the laminated structure 202. The sensing line 212 extends through the transport tubes 210 without any tension on the sensing lines 212 to prevent any stress or strain on the sensing line 212 within the transport tubes 210 in response to any forces being applied to the laminated structure 202.

FIG. 3 is a cross-sectional view of a laminated structure 300 including an example of a sensor assembly 302 configured to provide a stress sensor 304 of a sensor system in accordance with an embodiment. The sensor assembly 302 may be used for each of the sensor assemblies 108 in FIGS. 1 and 208 in FIG. 2. As understood by a person of ordinary skill, stress sensor 304 cannot directly measure stress, but rather a stress load may be inferred based on the electrical and/or optical response of one or more stress sensors 304. The sensor assembly 302 may be disposed between a first layer 306 of the laminated structure 300 and a second layer 308 of the laminated structure 300. The second layer 308 of the laminated structure 300 may be disposed on the first layer 306. The sensor assembly 302 may include a first anchor member 310 and a second anchor member 312 spaced at a predetermined distance "D" from the first anchor member 310. A sensor chamber 314 is formed between the first anchor member 310 and the second anchor member 312. A sensing line 316 extends between the first anchor member 310 and the second anchor member 312 through the sensor chamber 314 and the sensing line 316 extends through the first anchor member 310 and the second anchor member 312. The sensing line 316 includes a configuration within the sensor chamber 314 for sensing one of stress forces within the laminated structure 300. As understood by a person of ordinary skill, stress sensor 304 cannot directly measure stress, but rather a stress load may be inferred based on the electrical and/or optical response of one or more stress sensors 304. The stress sensor 304 measures the stretching or compression of the sensing line 316 between the anchor members 310 and 312. The sensing line 316 may be held within the sensor chamber 314 by the first anchor member 310 and the second anchor member 312 at a preset tension to form the stress sensor 304. A physical stress applied to the laminated structure 300 causes a corresponding change to the preset tension of the sensing line 316 within the sensor chamber 314. As previously described, a detection device, such as detection device 116 may be operatively connected to the sensing line 316. The detection device may be configured to detect the corresponding change to the preset tension of the sensing line 316 within the sensor chamber 314 caused by movement of the first anchor member 310 and the second anchor member 314 in response to one more forces being applied to the laminated structure 300.

As previously described, the sensing line 316 may be either an optical fiber or an electrically conductive wire. The detection device, such as detection device 116, may analyze an optical signal or signals or RF signal or signals transmitted through the sensing line 316 to determine a stress on the laminated structure 300 at a location of the stress sensor 304. The signals may be of any nature or characteristics that may permit monitoring and detection of any changes in time, frequency or amplitude or any combination of these parameters or properties of a transmitted signal caused by modification of the conductivity of the sensing line 316. The changes in these parameters or properties caused by modification of the conductivity of the sensing line 316 correspond to or can be translated to a measurement of temperature or stress in the laminated structure 102 similar to that previously described.

The sensor assembly 302 may also include a first transport tube 318 and a second transport tube 320. The first transport tube 318 may extend from the first anchor member 310 opposite the sensor chamber 314 and between the first layer 306 and the second layer 308 of the laminated structure 300. The second transport tube 320 may extend from the second anchor member 312 opposite the sensor chamber 314 and between the first layer 306 and the second layer 308 of the laminated structure 300. The sensing line 316 extends through the first transport tube 318 and the second transport tube 320 and may connect to adjacent sensor assemblies similar to that shown and described with reference to FIG. 1 and FIG. 2. The sensing line 316 extends through the first transport tube 318 and the second transport tube 320 without any tension on the sensing line 316 to prevent any stress on the sensing line 316 within the transport tubes 316 and 320 in response to forces being applied to the laminated structure 300.

FIG. 4 is a cross-sectional view of a laminated structure 400 including an example of a sensor assembly 402 configured to provide a thermal sensor 404 of a sensor system in accordance with an embodiment. The sensor assembly 402 may be used for each of the sensor assemblies 108 in FIGS. 1 and 208 in FIG. 2. The sensor assembly 402 may be disposed between a first layer 406 and a second layer 408 of the laminated structure 400. The second layer 408 of the laminated structure 400 may be disposed on the first layer 406. The sensor assembly 402 may include a first anchor member 410 and a second anchor member 412 spaced at a predetermined distance "D" from the first anchor member 410. A sensor chamber 414 is formed between the first anchor member 410 and the second anchor member 412. A sensing line 416 extends between the first anchor member 410 and the second anchor member 412 through the sensor chamber 414 and the sensing line 416 extends through the first anchor member 410 and the second anchor member 412. The sensing line 416 includes a configuration within the sensor chamber 414 for sensing temperature or temperature changes within the laminated structure 300.

The sensor assembly 402 may also include a thermally sensitive plate 418 disposed within the sensor chamber 414. The thermally sensitive plate 418 has known physical properties that allow the plate 418 to expand and contract in a defined manor for detection and measure of temperature and/or temperature changes. The thermally sensitive plate 418 may be attached to one of the first layer 406 or the second layer 408 of the laminated structure 400 within the sensor chamber 414. A selected portion 420 of the sensing line 416 may be attached to the thermally sensitive plate 418 to form the thermal sensor 404. The sensing line 416 extends from the thermally sensitive plate 418 respectively to the first anchor member 410 and the second anchor member 412 without any tension or a predetermined amount of slack in the sensing line 416. Changes in temperature in the sensor chamber 414 may cause the thermally sensitive plate 418 to distort or expand and contract which causes stress in the sensing line 416 corresponding to the temperature or changes in temperature.

Similar to that previously described, a detection device, such as detection device 116 may be operatively connected to the sensing line 416. The detection device may be configured to detect the corresponding stress in the sensing line 416 within the sensor chamber 414 caused by the distortion of the thermally sensitive plate 418 in response to the temperature or temperature changes in the sensor chamber 414.

As previously described, the sensing line 416 may be either an optical fiber or an electrically conductive wire. The detection device, such as detection device 116, may analyze an optical signal or signals or RF signal or signals transmitted through the sensing line 416 to determine a temperature or temperature changes within laminated structure 400 at a location of the thermal sensor 404.

The sensor assembly 402 may also include a first transport tube 422 and a second transport tube 424. The first transport tube 422 may extend from the first anchor member 410 opposite the sensor chamber 414 and between the first layer 406 and the second layer 408 of the laminated structure 400. The second transport tube 424 may extend from the second anchor member 412 opposite the sensor chamber 414 and between the first layer 406 and the second layer 408 of the laminated structure 400. The sensing line 416 extends through the first transport tube 422 and the second transport tube 424 and may connect to adjacent sensor assemblies similar to that shown and described with reference to FIG. 1 and FIG. 2. The sensing line 416 extends through the transport tubes 422 and 424 without any tension to prevent any stress on the sensing line 416 in response to any forces being applied to the laminated structure 400.

Figure 5:
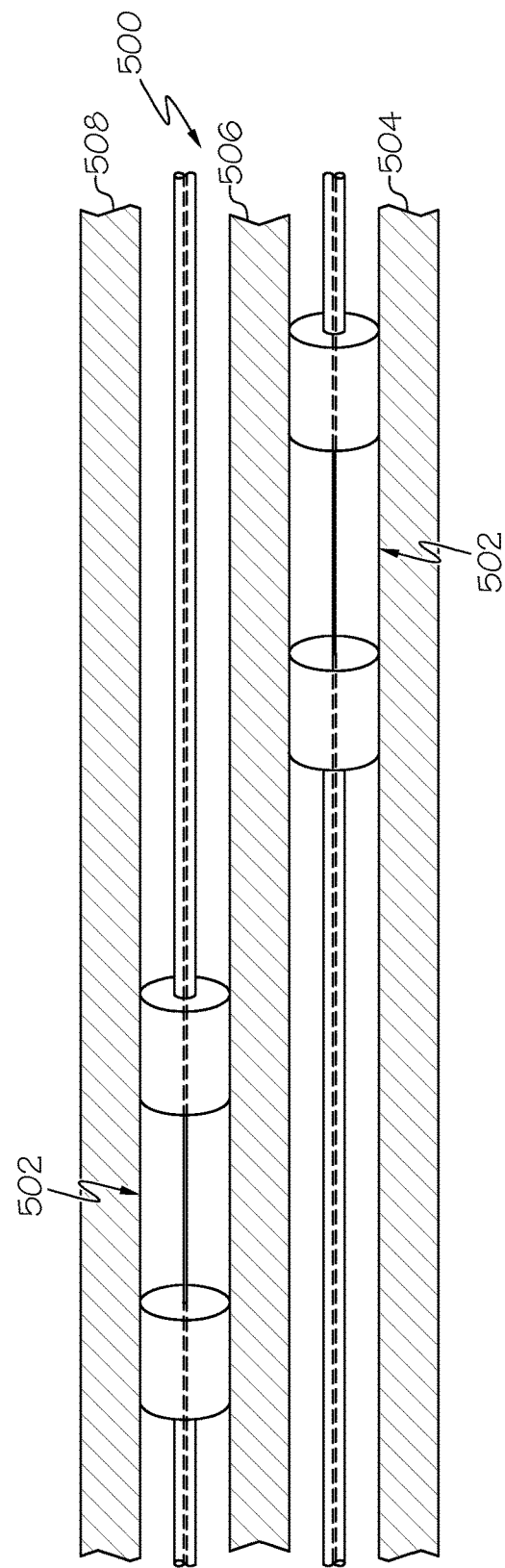
FIG. 5 is a cross-sectional view of an example of a multi-layer laminated structure and a plurality of sensor assemblies disposed in different layers of the multi-layer laminated structure in accordance with an embodiment.

FIG. 5 is a cross-sectional view of an example of a multi-layer laminated structure 500 and a plurality of sensor assemblies 502 disposed in different layers of the multi-layer laminated structure 500 in accordance with an embodiment. The exemplary multi-layered laminated structure 500 is shown as including a first layer 504, a second layer 506 and a third layer 508, although, the laminated structure 500 may have any number of layers. The sensor assemblies 502 shown in the exemplary embodiment in FIG. 5 are configured as stress sensors similar to the exemplary stress sensor 304 in FIG. 3. In another embodiment, the sensor assemblies 502 could also be configures as thermal sensors similar to the exemplary sensor assemblies 402 shown and described with reference to FIG. 4. In a further embodiment, a group of sensor assemblies in a laminated structure may be configured to provide stress sensors and another group of sensor assemblies in the laminated structure may be configured as thermal sensors. The sensor assemblies 502 are disposed between the different layers 504-508 to provide sensing or monitoring of stresses and/or temperature within the different layers 504-508. The sensor assemblies 502 may be offset from one another or spaced at predetermined intervals for optimum coverage of the laminated structure 500.

Figure 6:
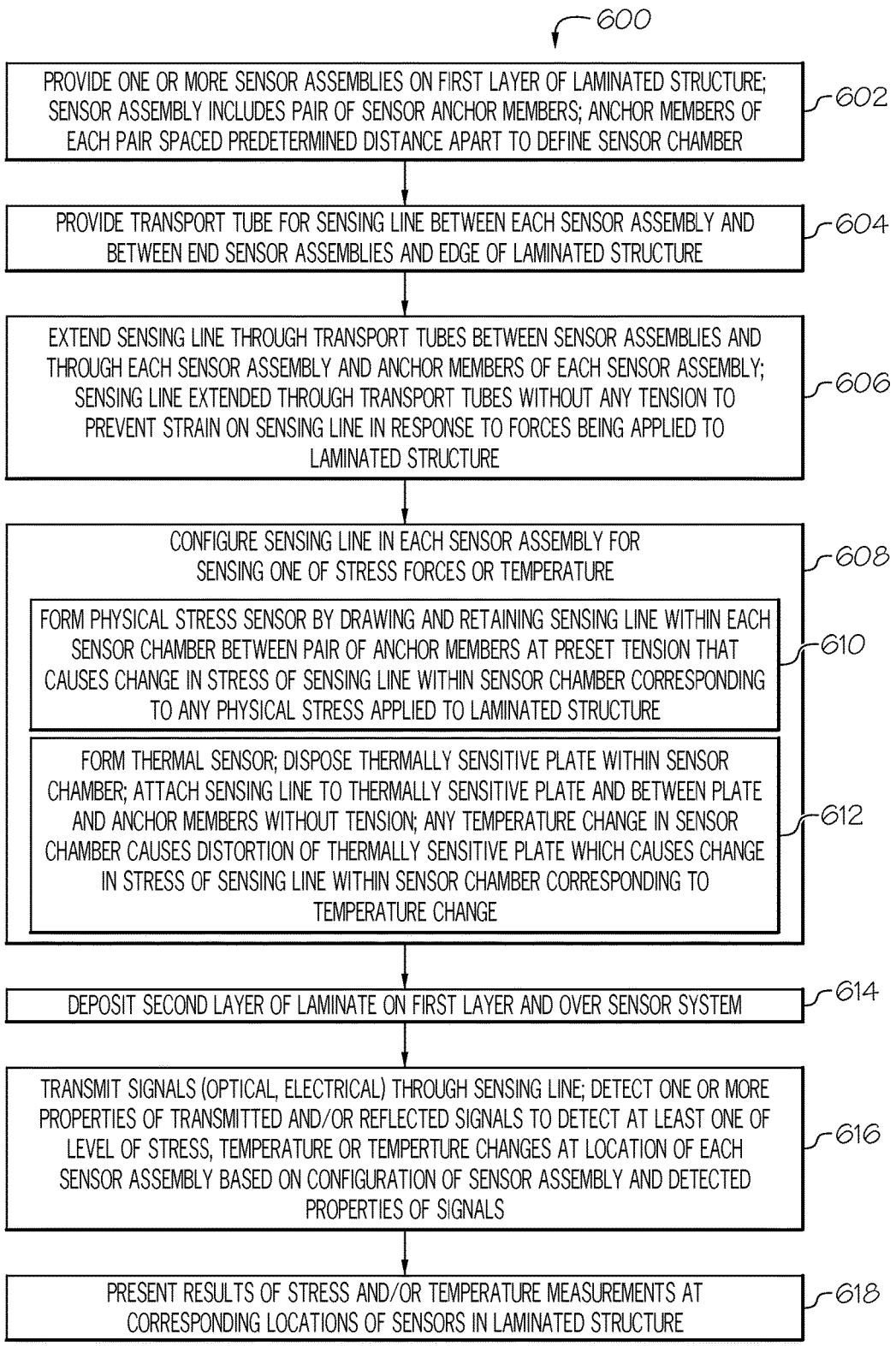
FIG. 6 is a flow chart of an example of a method for providing a sensor system in a laminated structure in accordance with an embodiment of the present disclosure.

FIG. 6 is a flow chart of an example of a method 600 for providing a sensor system in a laminated structure in accordance with an embodiment of the present disclosure. The sensor system may be similar to sensor system 100 in FIG. 1 or 200 in FIG. 2. In block 602, one or more sensor assemblies may be provided on a first layer of material of a laminated structure. Each sensor assembly may include a pair of sensor anchor members. The sensor anchor members in each sensor assembly may be spaced a predetermined distance apart to define a sensor chamber between each pair of sensor anchor members.

In block 604, a transport tube for carrying a sensing line may be provided between each of the sensor assemblies. The sensor assemblies may be connected in series by the transport tubes and the sensing line. Another transport tube may connect the sensor assembly at each end of the series connected sensor assemblies and an edge of the laminated structure and provide access to each end the sensing line at a respective edge of the laminated structure.

In block 606, the sensing line may be extended through the transport tubes between each of the sensor assemblies and through the sensor anchor members of each sensor assembly. The sensing line may be either an optical fiber or an electrical conductive wire. The sensing line may extend through the transport tubes without any tension to prevent any strain on the sensing line in response to forces being applied to the laminated structure.

In block 608, the sensing line may be configured in each sensor assembly as a stress sensor for sensing stress forces or a thermal sensor for sensing temperature or temperature changes.

In block 610, a physical stress sensor may be formed by drawing and retaining the sensing line within each sensor chamber at a preset tension. Any physical stress applied to the laminated structure may cause movement of the sensor anchor members and a corresponding change in the preset tension of the sensing line within the sensor chamber.

In block 612, a thermal sensor may be formed in a sensor assembly by disposing a thermally sensitive plate within the sensor chamber. The sensing line may be attached to the thermally sensitive plate. The ends of the sensing line are attached between the plate and the sensor anchor members without any tension or a predetermined amount of slack in the sensing line. Any temperature changes in the sensor chamber may cause distortion of the thermally sensitive plate which causes a change in stress of the sensing line corresponding to the temperature or temperature changes.

In block 614, a second layer of material of the laminated structure may be deposited on the first layer of material and over the sensor system.

In block 616, a signal or signals may be transmitted through the sensing line. The transmitted signal or signals may be an optical signal or signals if the sensing line is an optical fiber. The transmitted signal or signals may be an RF signal or signals if the sensing line is an electrically conductive wire. As previously discussed, changes or modification of conductivity of the sensing line may cause changes in the transmitted signal or signals that may be detected. One or more properties of the transmitted signal or signals, such as changes in amplitude, may be detected to determine at least one of a level of stress or temperature or temperature changes at a location of each sensor assembly based on the detected properties of the signals or analysis of the received signals.

In block 618, results of the stress and or temperature measurements and analysis may be presented at the corresponding locations of the sensors or sensor assemblies in the laminated structure. For example, the results may be presented to a user viewing a display (126/226).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A sensor system (100, 200) for a laminated structure (102, 202, 300, 400), comprising:

a sensor assembly (108, 108a, 208, 402, 502) disposed between a first layer (104, 204) of the laminated structure and a second layer (106, 206) of the laminated structure, the second layer of the laminated structure being disposed on the first layer, the sensor assembly comprising:
- a first anchor member (310, 410);
- a second anchor member (312, 412) spaced at a predetermined distance (D) from the first anchor member;
- a sensor chamber (314, 414) formed between the first anchor member and the second anchor member; and
a sensing line (112, 212, 316, 416) extending between the first anchor member and the second anchor member through the sensor chamber and the sensing line extending through the first anchor member and the second anchor member, the sensing line comprising a configuration within the sensor chamber for sensing one of stress forces within the laminated structure, temperature or temperature changes within the laminated structure;
a first transport tube (110, 210, 318, 422) extending from the first anchor member opposite the sensor chamber and between the first layer of the laminated structure and the second layer of the laminated structure; and
a second transport tube (110, 210, 320, 424) extending from the second anchor member opposite the sensor chamber and between the first layer of the laminated structure and the second layer of the laminated structure, the sensing line extending through the first transport tube and the second transport tube, wherein the first transport tube and the second transport tube are separate from the laminated structure.

2. The sensor system of claim 1, wherein the sensing line extends through the first transport tube and the second transport tube without any tension on the sensing line to prevent any stress on the sensing line within the first transport tube and the second transport tube in response to forces being applied to the laminated structure.

3. The sensor system of claim 1, wherein the sensing line is held within the sensor chamber by the first anchor member and the second anchor member at a preset tension to form a stress sensor (304), wherein a physical stress applied to the laminated structure causes a corresponding change to the preset tension of the sensing line within the sensor chamber.

4. The sensor system of claim 3, further comprising a detection device (116) connected to the sensing line, the detection device being configured to detect the corresponding change to the preset tension of the sensing line within the sensor chamber caused by movement of the first anchor member and the second anchor member in response to one more forces being applied to the laminated structure.

5. The sensor system of claim 4, wherein the sensing line comprises an optical fiber and the detection device comprises:
- an optical signal generator (118, 214) that transmits an optical signal through the optical fiber optic;
- an optical signal detector (120, 218) that measures one or more properties of the transmitted optical signal at an output (130) of the optical fiber;
- a signal processing module (124, 224) that determines a stress on the laminated structure at a location of the stress sensor based on the measured one or more properties of the transmitted optical signal; and
- a display (126, 226) to present the determined stress on the laminated structure.

6. The sensor system of claim 4, wherein the sensing line comprises an electrically conductive wire and the detection device comprises:
- a radio frequency (RF) signal generator (118, 214) that transmits an RF signal through the electrically conductive wire;
- an RF receiver (120, 218) that measures one or more properties of the transmitted RF signal at an output (130) of the electrically conductive wire;
- a signal processing module (124, 224) that determines a stress on the laminated structure at a location of the stress sensor based on the measured one or more properties of the transmitted RF signal; and
- a display (126, 226) to present the stress on the laminated structure.

7. The sensor system of claim 1, wherein the sensor assembly further comprises a thermally sensitive plate (418) disposed within the sensor chamber and a selected portion (420) of the sensing line is attached to the thermally sensitive plate to form a thermal sensor (404) and the sensing line extends from the thermally sensitive plate respectively to the first anchor member and the second anchor member without any tension or a predetermined amount of slack, wherein changes in temperature in the sensor chamber cause the thermally sensitive plate to distort which causes stress in the sensing line corresponding to the temperature or changes in temperature.

8. The sensor system of claim 7, further comprising a detection device (116) connected to the sensing line, the detection device being configured to detect changes in stress in the sensing line within the sensor chamber, the changes in stress in the sensing line corresponding to the temperature or changes in temperature in the sensor chamber.

9. The sensor system of claim 8, wherein the sensing line comprises an optical fiber and the detection device comprises:
- an optical signal generator (118, 214) that transmits an optical signal through the optical fiber optic;
- an optical signal detector (120, 218) that measures one or more properties of the transmitted optical signal at an output (130, 220) of the optical fiber;
- a signal processing module (124, 224) that determines a temperature at a location of the thermal sensor (404) based on the measured one or more properties of the transmitted optical signal; and
- a display (126, 226) for presenting the temperature or temperature changes at the location of the thermal sensor.

10. The sensor system of claim 8, wherein the sensing line comprises an electrically conductive wire and the detection device comprises:
- a radio frequency (RF) signal generator (118, 214) that transmits an RF signal through the electrically conductive wire;
- an RF receiver (120, 218) that measures one or more properties of the transmitted RF signal at an output of the electrically conductive wire;
- a signal processing module (124, 224) that determines a temperature at a location of the thermal sensor based on the measured one or more properties of the transmitted RF signal; and
- a display (126, 226) to present the temperature or temperature changes at the location of the thermal sensor.

11. The sensor system of claim 1, further comprising:
- a plurality of sensor assemblies (108, 108a, 208, 208a) distributed at predetermined locations in the laminated structure between the first layer of the laminated structure and the second layer of the laminated structure, the sensing line comprising a configuration within each sensor assembly to provide one of a stress sensor (304) that senses stress forces within the laminated structure or a thermal sensor (404) that senses temperature or temperature changes within the laminated structure;
a plurality of transport tubes (110, 210), one of the plurality of transport tubes extending between adjacent sensor assemblies of the plurality of sensor assemblies, the plurality of sensor assemblies being connected in series by the transport tubes, and another one (110*a*) of the transport tubes extending from each end sensor assembly (108*a*, 208*a*) of the series connected sensor assemblies to an edge (114, 213) of the laminated structure, the sensing line extending through the plurality of transport tubes without any tension on the sensing line within the transport tubes in response to forces being applied to the laminated structure.

12. The sensor system of claim 11, further comprising:
a receiver (120, 218) operatively connected to the sensing line and configured to receive signals from the plurality of sensor assemblies; and
a processor (122, 222) programmed with a location of each of the plurality of sensor assemblies within the laminated structure, the processor being configured to determine one of a physical stress or a temperature for each of the sensor assemblies based on the signals from the plurality of sensor assemblies.

13. The sensor system of claim 12, further comprising a display (126, 226) configured to receive and present a representation of at least one of stress and temperature measurements within the laminated structure.

14. A sensor (108, 108*a*, 208, 208*a*, 304, 404) for a laminated structure (102, 202, 300, 400) comprising a first layer (104, 204) and a second layer (106, 206), the sensor comprising:
a first anchor member (310, 410);
a second anchor member (312, 412) spaced at a predetermined distance (D) from the first anchor member;
a sensor chamber (314, 414) formed between the first anchor member and the second anchor member;
a sensing line (112, 212, 316, 416) extending between the first anchor member and the second anchor member through the sensor chamber and the sensing line extending through the first anchor member and the second anchor member, the sensing line comprising a configuration within the sensor chamber for sensing one of stress forces within the laminated structure, temperature or temperature changes within the laminated structure;
a first transport tube (110, 210, 318, 422) extending from the first anchor member opposite the sensor chamber and between the first layer of the laminated structure and the second layer of the laminated structure; and
a second transport tube (110, 210, 320, 424) extending from the second anchor member opposite the sensor chamber and between the first layer of the laminated structure and the second layer of the laminated structure, the sensing line extending through the first transport tube and the second transport tube, wherein the sensing line extends through the first transport tube and the second transport tube without any tension on the sensing line to prevent any stress on the sensing line within the first transport tube and the second transport in response to forces being applied to the laminated structure, wherein the first transport tube and the second transport tube are separate from the laminated structure.

15. The sensor of claim 14, wherein the sensor comprises a stress sensor (304), the sensing line being held within the sensor chamber by the first anchor member and the second anchor member at a preset tension to form the stress sensor, wherein a physical stress applied to the laminated structure causes a corresponding change to the preset tension of the sensing line within the sensor chamber.

16. The sensor of claim 14, wherein the sensor comprises a thermal sensor (404), the thermal sensor comprising a thermally sensitive plate (418) disposed within the sensor chamber (414) and a selected portion (420) of the sensing line is attached to the thermally sensitive plate to form the thermal sensor and the sensing line extends from the thermally sensitive plate respectively to the first anchor member and the second anchor member without any tension or a predetermined amount of slack, wherein changes in temperature in the sensor chamber cause the thermally sensitive plate to distort which causes stress in the sensing line corresponding to the temperature or changes in temperature.

17. The sensor of claim 14, wherein the sensing line comprises one of an optical fiber and an electrically conductive wire.

18. A method (600) of sensing at least one of stress and temperature within a laminated structure (102, 202, 300, 400), comprising:
providing one or more pairs of sensor anchor members (310, 312, 410, 412) on a first layer (104, 204, 306, 406) of the laminated structure, each pair of sensor anchor members being spaced a predetermined distance (D) apart to provide a sensor chamber (314, 414) between each pair of sensor anchor members;
providing a transport tube (110, 210, 318, 320, 422, 424) between each pair of sensor anchor members on the first layer of the laminated structure;
extending a sensing line (112, 212, 316, 416) through each transport tube and through each sensor chamber, the sensing line being extended through each transport tube without any tension on the sensing line within each transport tube to prevent any stress on the sensing line in the transport tube in response to forces being applied to the laminated structure;
configuring each sensing line within each sensor chamber for sensing one of stress forces within the laminated structure, temperature or temperature changes within the laminated structure; and
depositing a second layer (106, 206, 308, 408) of the laminated structure on the first layer, wherein the transport tube between each pair of sensor anchor members are separate from the laminated structure.

19. The method of claim 18, further comprising forming a stress sensor (304) by drawing and retaining the sensing line within a particular sensor chamber (314) between the pair of sensor anchor members at a preset tension, wherein a physical stress applied to the laminated structure causes a corresponding change to the preset tension of the sensing line within the particular sensor chamber.

20. The method of claim 18, further comprising forming a thermal sensor (404), forming the thermal sensor comprising:
disposing a thermally sensitive plate (418) within a particular sensor chamber (414);
attaching a selected portion (420) of the sensing line to the thermally sensitive plate to form the thermal sensor; and extending the sensing line from the thermally sensitive plate respectively to a first anchor member (410) and a second anchor member (412) of the pair of anchor members of the particular sensor chamber without any tension or a predetermined amount of slack, wherein changes in temperature in the particular sensor chamber cause the thermally sensitive plate to distort which causes stress in the sensing line corresponding to the temperature or changes in temperature.

\* \* \* \* \*